US009405959B2

(12) United States Patent
Dubberley et al.

(10) Patent No.: US 9,405,959 B2
(45) Date of Patent: Aug. 2, 2016

(54) SYSTEM AND METHOD FOR CLASSIFICATION OF OBJECTS FROM 3D RECONSTRUCTION

(71) Applicants: John R. Dubberley, New Orleans, LA (US); Bruce Y. Lin, New Orleans, LA (US)

(72) Inventors: John R. Dubberley, New Orleans, LA (US); Bruce Y. Lin, New Orleans, LA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 545 days.

(21) Appl. No.: 14/023,846

(22) Filed: Sep. 11, 2013

(65) Prior Publication Data

US 2014/0254324 A1 Sep. 11, 2014

Related U.S. Application Data

(60) Provisional application No. 61/776,372, filed on Mar. 11, 2013.

(51) Int. Cl.
*G01S 15/00* (2006.01)
*G06K 9/00* (2006.01)
*G01S 7/539* (2006.01)
*G01S 15/89* (2006.01)
*G06T 17/05* (2011.01)
*G06K 9/46* (2006.01)

(52) U.S. Cl.
CPC ............ *G06K 9/00201* (2013.01); *G01S 7/539* (2013.01); *G01S 15/8902* (2013.01); *G06K 9/4661* (2013.01); *G06T 17/05* (2013.01)

(58) Field of Classification Search
USPC ........................................................... 367/88
See application file for complete search history.

(56) References Cited

U.S. PATENT DOCUMENTS

| 5,155,706 | A  | * | 10/1992 | Haley et al. ........................ 367/7 |
| 5,214,744 | A  | * | 5/1993  | Schweizer et al. ............ 382/103 |
| 5,321,667 | A  | * | 6/1994  | Audi et al. ...................... 367/88 |
| 5,493,539 | A  | * | 2/1996  | Haley et al. .................... 367/88 |
| 5,612,928 | A  | * | 3/1997  | Haley et al. .................... 367/11 |
| 5,995,882 | A  | * | 11/1999 | Patterson et al. .............. 701/21 |
| 6,134,344 | A  |   | 10/2000 | Burges |
| 6,868,041 | B2 | * | 3/2005  | Preston et al. .................. 367/88 |
| 6,897,802 | B1 | * | 5/2005  | Daniell et al. .................. 342/90 |
| 7,116,265 | B2 | * | 10/2006 | Shu et al. .................... 342/25 R |
| 7,221,621 | B2 | * | 5/2007  | Patterson et al. .............. 367/88 |
| 7,315,485 | B1 | * | 1/2008  | Stack et al. .................... 367/11 |
| 7,398,259 | B2 | * | 7/2008  | Nugent ........................... 706/33 |

(Continued)

OTHER PUBLICATIONS

Gendron, M.; Lohrenz, M.; Dubberley, J., "Automated change detection using Synthetic Aperture Sonar imagery," OCEANS 2009, MTS/IEEE Biloxi—Marine Technology for Our Future: Global and Local Challenges , vol., No., pp. 1,4, Oct. 26-29, 2009.*

(Continued)

*Primary Examiner* — James Hulka
(74) *Attorney, Agent, or Firm* — US Naval Research Laboratory; Scott G. Bell (57) ABSTRACT

System and method for detecting and classifying man-made objects on the seafloor using 3D reconstruction techniques. Enhanced sea floor object detection with classification is provided that is as good as provided by short range optical imagery. This approach eliminates the step of passing off identification to humans, and enhances the speed, accuracy, and safety of present operations in mine detection and neutralization.

20 Claims, 6 Drawing Sheets

(56) References Cited

U.S. PATENT DOCUMENTS

| | | | |
|---|---|---|---|
| 7,990,804 B2 | 8/2011 | Gendron et al. | |
| 2005/0270905 A1* | 12/2005 | Patterson et al. | 367/88 |
| 2006/0036559 A1* | 2/2006 | Nugent | 706/23 |
| 2006/0176209 A1* | 8/2006 | Shu et al. | 342/25 R |
| 2012/0093381 A1 | 4/2012 | Fan et al. | |

OTHER PUBLICATIONS

Perry, SW, "Applications of Image Processing to Mine Warfare Sonar". DSTO-GD-0237. Maritime Operations Division Aeronautical and Maritime Research Laboratory. 2000. (20 pages).*

Xiu-Fen Ye, Zhe-Hui Zhang, Peter X. Liu, Hong-Ling Guan, Sonar image segmentation based on GMRF and level-set models, Ocean Engineering, vol. 37, Issue 10, Jul. 2010, pp. 891-901.*

Midtgaard, O.; Hansen, R.E.; Saebo, T.O.; Myers, V.; Dubberley, J.R.; Quidu, I., "Change detection using Synthetic Aperture Sonar: Preliminary results from the Larvik trial," OCEANS 2011, vol., No., pp. 1,8, Sep. 19-22, 2011.*

Celik, T.; Tjahjadi, T., "A Novel Method for Sidescan Sonar Image Segmentation," Oceanic Engineering, IEEE Journal of, vol. 36, No. 2, pp. 186,194, Apr. 2011.*

Dubberley, J.R.; Gendron, M.L., "Synthetic Aperture Sonar low frequency vs. high frequency automatic contact generation," OCEANS 2009, MTS/IEEE Biloxi—Marine Technology for Our Future: Global and Local Challenges , vol., No., pp. 1,4, Oct. 26-29, 2009.*

Lin, Bruce, Augmented Breast Tumor Classification by Perfusion Analysis, LSU Computer Science Doctoral Dissertation, Dec. 2010.

Lohrenz, M. C., Gendron, M. L. and Layne, G. J., Automated Change Detection and Classification (ACDC) System, 2005 NRL Review, pp. 155-157, 2005.

Allen, Christopher T., Interferometric Synthetic-Aperture Radar(InSAR) and Applications, Course website, www.cresis.ku.edu/~callen/826/EECS826.htm, 2009.

Coiras, Enrique and Groen, Johannes, 3D Target Shape form SAS Images Based on Deformable Mesh, 3rd International Conference and Exhibition on Underwater Acoustic Measurements: Technologies and Results, Jun. 21-26, 2009 Conference, pp. 1-7, Dec. 2009.

Llort-Pujol, Gerard, Sintes, Christophe, Chonavel, Thierry, Morrison, III, Archie T., and Daniel, Sylvie, Advanced Interferometric Techniques for High-Resolution Bathymetry, Journal of Marine Technology Society, pp. 1-27, 2011.

Savarese, Silvio, Shape Reconstruction from Shadows and Reflections, CA Institute of Technology, PhD Thesis, Pasadena, CA, pp. 1-133, 2005.

Gendron, Marlin, Dubberley, John, and Lohrenz, Maura, Synthetic Aperture Sonar Automatic Target Recognition Issues, Acoustics 2010 Istanbul Conference, 2010.

Gendron, Marlin, Lohrenz, Maura and Dubberley, John, Automated Change Detection Using Synthetic Aperture Sonar Imagery, Proceedings of the Oceans 2009 Conference, pp. 1-4, Oct. 26-29, 2009.

Dubberley, John and Gendron, Marlin, Synthetic Aperture Sonar Low Frequency vs. High Frequency Automatic Contact Generation. Proceedings of the Oceans 2009 Conference, Oct. 26-29, 2009.

Dubberley, John and Gendron, Marlin, Change Detection Deconfliction Process for Sonar Clutter Items, Journal of the Acoustical Society of America, pp. 1-3, Apr. 8, 2009.

Dubberley, John, Gendron, Marlin, and Lohrenz, Maura, Automated Change Detection with Area Matching, Acoustics '08 Paris, pp. 6367-6371, Jun. 29-Jul. 4, 2008.

* cited by examiner

SYSTEM AND METHOD FOR CLASSIFICATION OF OBJECTS FROM 3D RECONSTRUCTION

CROSS-REFERENCE TO RELATED APPLICATIONS

This application is a non-provisional application claiming priority to U.S. Provisional Patent Application No. 61/776,372, entitled SYSTEM AND METHOD FOR CLASSIFICATION OF OBJECTS FROM 3D RECONSTRUCTION filed on Mar. 11, 2013, under 35 USC 119(e). The entire disclosure of the provisional application is incorporated herein by reference.

BACKGROUND

Methods and systems disclosed herein relate generally to seafloor object detection and more specifically to 3D reconstruction.

Figure 1:
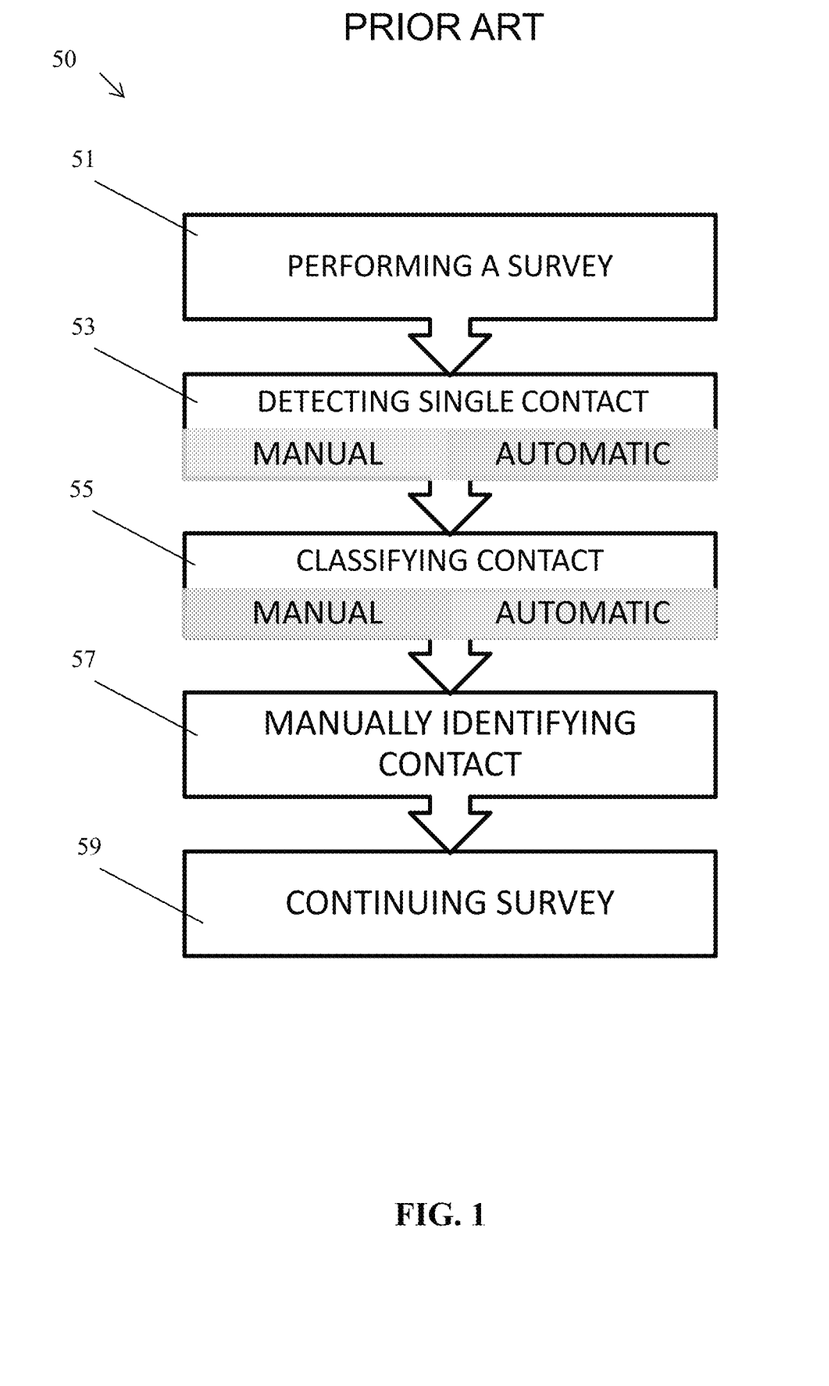
FIG. 1 is a flowchart of the method of the prior art.

Referring now to FIG. 1, prior art methods used, at best, a semi-automated approach to detect contacts and classify them. Method 50, for example, can require twelve man hours to complete for each six hour mission. Method 50 can include performing 51 a survey, manually or automatically detecting 53 a single contact, manually or automatically classifying 55 the contact, manually identifying 57 the contact, and continuing 59 the survey. After classifying 55 the contact, detecting 53 is passed off to either a dolphin or dive team for identifying 57. U.S. Pat. No. 6,134,344, METHOD AND APPARATUS FOR IMPROVING THE EFFICIENCY OF SUPPORT VECTOR MACHINES, Christopher J. Burges, published Oct. 17, 2000, (Burges), incorporated herein in its entirety, discloses a method and apparatus for improving the efficiency of any machine that uses an algorithm that maps to a higher dimensional space in which a given set of vectors are used. A support vector machine (SVM) is a supervised learning model that analyzes data and recognized patterns. For a set of inputs, an SVM predicts which of two possible classes forms the output. Each of a set of training examples is categorized according to its class, with the separate categories being separated by a clear gap. United States Patent Application #2012/0093381, METHOD AND SYSTEM FOR BRAIN TUMOR SEGMENTATION IN MULTI-PARAMETER 3D MR IMAGES VIA ROBUST STATISTIC INFORMATION PROPAGATION, Young Fan et al., published Apr. 19, 2012, (Fan) discloses the use of an SVM in brain tumor segmentation.

What is needed to provide enhanced sea floor object detection with classification as good as provided by short range optical imagery. What is also needed is an approach that would require a short recap of a mission, on the order of thirty minutes per six hour mission. What is importantly needed is an approach that would eliminate the step of passing off identification to humans. These improvements can greatly enhance the speed, accuracy, and safety of present operations in mine detection and neutralization.

SUMMARY

The system and method of the present embodiment provide a filter that distinguishes between man-made and natural objects. This filter notes that natural objects tend not to be platonic shapes (square, rectangle, circle, etc.) while man-made objects generally occur in these shapes. Furthermore, natural objects can have more sea encrustation and can lack the smooth surfaces encountered on man-made objects. These variations can be detected by noting the pixel-to-pixel variation in the sonar intensity returned from the object. A man-made object could have little pixel variation on one facet, a sharp discontinuity as the image crosses a facet boundary, and then little variation on the next facet. Natural objects tend to have a more continuous variation in pixel intensity.

The system and method can further use a three-dimensional reconstruction of the object as the base image for classification rather than a single two-dimensional combined object and shadow image. Given the traditional problems reacquiring an object in the marine environment it was logical in the past to classify on single object and shadow images. However, with the advent of better autonomous underwater vehicle navigation, the system of the present embodiment can meld multiple looks at an object together to produce a three-dimensional reconstruction of the object. To increase the robustness of the result, two independent techniques are used for the three-dimensional reconstruction. The first technique is interferometry between two sonar arrays to extract height characteristics of the object. The second technique is shape-from-shadow which can give a strong indication of the overall shape of the object by looking at the pixel-to-pixel intensity variation across the object and implying a curvature from that variation. These three-dimensional objects can contain information, for example, but not limited to, height, object curvature, surface normal that can help classify the object and that doesn't varies by viewing angle (shadow).

The method of the present embodiment for detecting and classifying man-made objects on the seafloor can include, but is not limited to including, creating a filter to detect the differences in general characteristics between natural and manmade objects, receiving sonar intensity data from the seafloor, selecting from the sonar intensity data manmade objects based on the filter, creating a 3D reconstruction of the selected manmade objects by melding multiple scans of information about the selected manmade objects based on both a shape-from-shadow technique and an interferometric bathymetry technique, creating feature vectors based on the 3D reconstruction, and classifying the feature vectors into types of manmade objects based on segmentation, support vector machine (SVM), and clustering. Creating the filter can include detecting pixel to pixel variation in seafloor digital images indicating differentiation between platonic and non-platonic shapes, detecting pixel to pixel variation in seafloor digital images indicating differentiation between objects based on sea encrustation on the objects, or detecting pixel to pixel variation in seafloor digital images indicating differentiation based on a facet boundary. Creating a 3D reconstruction can include extracting height characteristics from the sonar intensity data by performing interferometry between two sonar arrays of the sonar intensity data, or detecting pixel to pixel intensity variation across the sonar intensity data and implying a curvature from that variation.

An alternate method for detecting and classifying man-made objects on the seafloor can include, but is not limited to including, creating a filter to detect differences in characteristics between natural and manmade objects on the seafloor, receiving sonar intensity data from the seafloor, selecting manmade objects from the sonar intensity data based on the filter, creating a 3D reconstruction of the selected manmade objects by melding multiple scans of information about the selected manmade objects, creating feature vectors based on the 3D reconstruction, and classifying the feature vectors into types based on segmentation, SVM, and clustering. The step of creating the 3D reconstruction can optionally include detecting pixel to pixel variation in seafloor digital images indicating differentiation between platonic and non-platonic shapes, or detecting pixel to pixel variation in seafloor digital images indicating differentiation between objects based on sea encrustation on the objects, or detecting pixel to pixel variation in seafloor digital images indicating differentiation based on facet boundaries of the objects, or extracting height characteristics from the sonar intensity data by performing interferometry between two sonar arrays of the sonar intensity data, or detecting pixel to pixel intensity variation across the sonar intensity data and implying a curvature from the variation. Implying a curvature can optionally be performed by using a shape-from-shadow technique. Creating feature vectors can optionally be performed by computing lengths and widths of the objects in pixels based on the number of pixels along the length and width, and multiplying the length pixel number and the width pixel number by a length pixel size and a width pixel size, respectively, or determining a greatest reflection from the object and basing the feature vectors on the greatest reflection, or computing the difference between pixel intensity of the brightest pix in the object and the darkest pixel in the shadow.

One embodiment of the computer system of the present teachings for detecting and classifying manmade objects on the seafloor can include, but is not limited to including, a filter processor executing on a computer creating a filter to detect differences in characteristics between natural and manmade objects on the seafloor, the filter processor receiving sonar intensity data from the seafloor, an object processor executing on the computer selecting manmade objects from the sonar intensity data based on the filter, a 3D reconstruction processor executing on the computer creating a 3D reconstruction of the selected manmade objects by melding multiple scans of information about the selected manmade objects, a feature vector creator executing on the computer creating feature vectors based on the 3D reconstruction, and a classifier executing on the computer classifying the feature vectors into types based on segmentation, SVM, and clustering. The system can optionally include a pixel processor executing on the computer that can optionally detect pixel to pixel variation in seafloor digital images indicating differentiation between platonic and non-platonic shapes. The pixel processor can also optionally detect pixel to pixel variation in seafloor digital images indicating differentiation between objects based on sea encrustation on the objects, and can optionally detect pixel to pixel variation in seafloor digital images indicating differentiation based on facet boundaries of the objects, and can optionally extract height characteristics from the sonar intensity data by performing interferometry between two sonar arrays of the sonar intensity data, and can optionally detect pixel to pixel intensity variation across the sonar intensity data, and implying a curvature from the variation. The feature vector creator can optionally compute lengths and widths of the objects in pixels based on the number of pixels along the length and width and multiplies the length pixel number and the width pixel number by a length pixel size and a width pixel size, respectively, and that can determine a greatest reflection from the object and can base the feature vectors on the greatest reflection, and that can compute the difference between pixel intensity of the brightest pix in the object and the darkest pixel in the shadow.

These and other aspects and features of the present teachings will become apparent from the following detailed description of the exemplary embodiments, read in conjunction with, and with reference to, the accompanying drawings.

BRIEF DESCRIPTION OF THE DRAWINGS

Referring now to the drawings, in which like numerals represent like elements, aspects of the exemplary embodiments will be described in connection with the drawing set.

DETAILED DESCRIPTION

The problems set forth above as well as further and other problems are solved by the present teachings. These solutions and other advantages are achieved by the various embodiments of the teachings described herein below.

Figure 2:
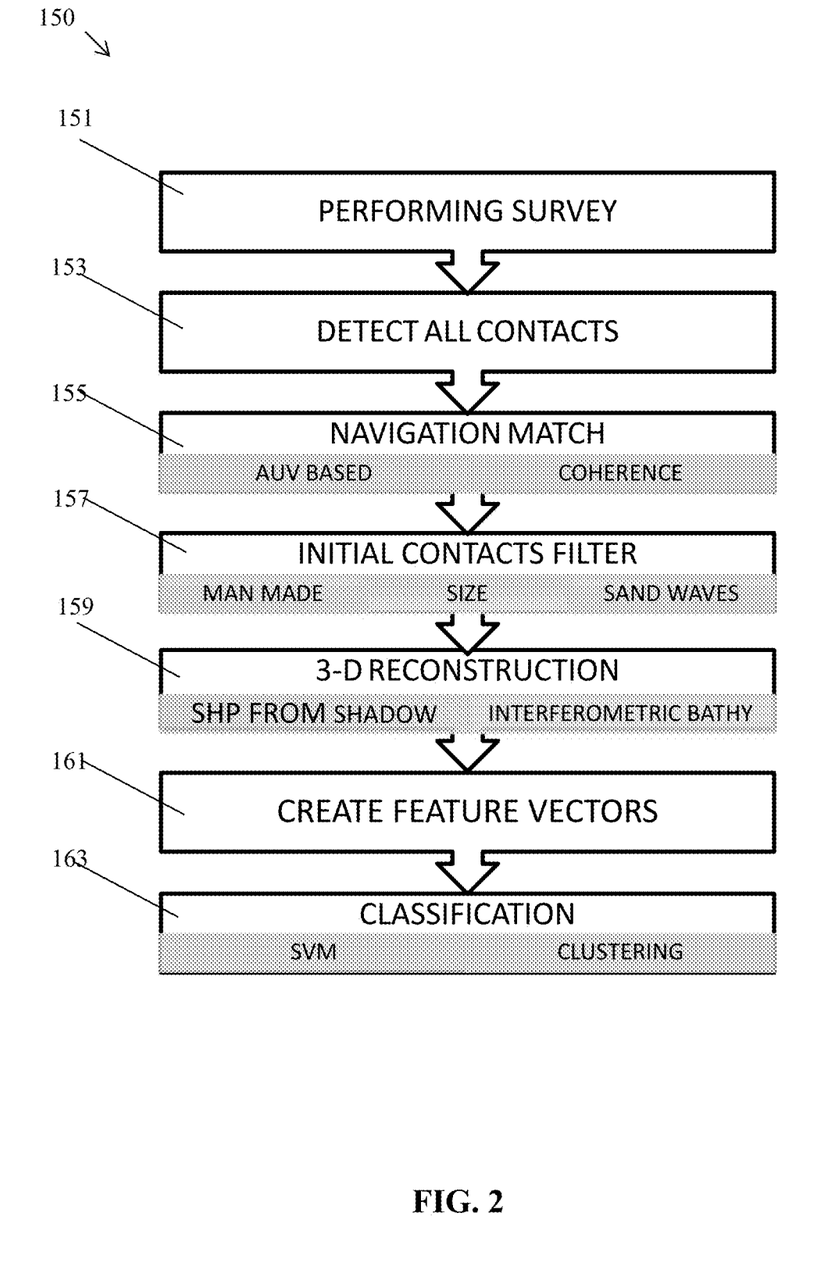
FIG. 2 is a flowchart of an exemplary method of the present embodiment.

Referring now to FIG. 2, method 150 of the present embodiment for detecting and classifying man-made objects on the seafloor can include taking 151 a survey, for example, an ocean bottom survey, detecting 153 all the contacts, performing 155 an AUV-based navigation match, and applying 157 an initial contacts filter based on, for example, but not limited to, man-made versus natural objects, size, and sand waves. Method 150 can also include three-dimensional reconstruction 159 using a shape-from-shadow technique (see Coiras, Groen, 3D *Target Shape form SAS Images Based on Deformable Mesh, UAM* 2009 *Conference*) and interferometric bathymetry (see, for example, LLort-Pujol et al., *Advanced Interferometric Techniques For High-Resolution Bathymetry, Journal of Marine Technology Society,* 2011), creating 161 feature vectors, and classification 163 based on support vector machine technology (see U.S. Pat. No. 6,134, 344) and clustering. Feature vectors are created using the information from the image. To create feature vectors, for example, an object's length (here assumed along the image) in number of pixels along the object is counted and then multiplied by the pixel size giving the length of the object. For width the same process is used. A feature vector might be created based on the size of greatest reflection from the image. A further feature vector might be created based on the difference between pixel intensity of the brightest pixel in the object and the darkest pixel in the shadow. The feature vector characterization for classification can be, for example, but not limited to, a morphology vector, texture, intensity, volume, surface normal, penetrability, and pixel histogram analysis. The man-made category can be further refined based on mine-like versus non-mine-like characteristics, for example, or any other possible refinement The objectives of method 150 are (1) to improve automated target recognition, (2) to introduce the man-made versus natural filter, (3) to meld/refine three-dimensional reconstruction, (4) to include characteristic vector creation, and (5) to include algorithms tuned to the three-dimensional nature of multi-view synthetic aperture sonar (SAS) images.

Figure 3A:
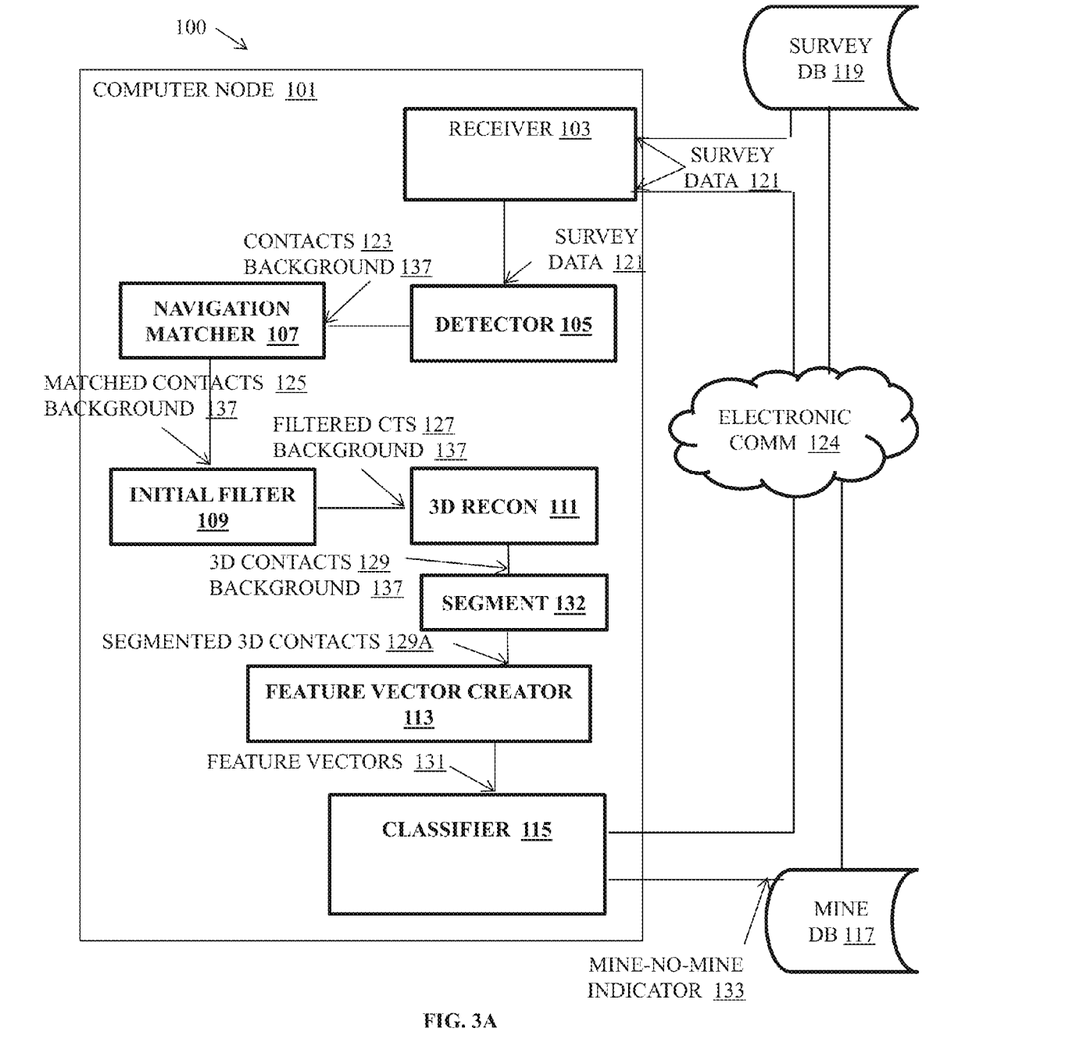
FIG. 3A is a schematic block diagram of one embodiment of the system of the present teachings.

Referring now to FIG. 3A, system 100 of the present teachings for detecting and classifying man-made objects on the seafloor can include, but is not limited to including, receiver 103 receiving survey data 121, detector 105 detecting contacts 123 from survey data 121, using segmentation processor 132 to isolate contacts 123 from background 137, navigation matcher 107 performing navigation match on contacts 123 to isolate matched contacts 125, and initial filter 109 applying an initial contacts filter to matched contacts 125 based on, for example, but not limited to, man-made versus natural objects, size, and sand waves and producing filtered matched contacts 127. System 100 can also include three-dimensional reconstruction processor 111 performing 3D reconstruction (see FIG. 4) of filtered matched contacts 127 using a shape-from-shadow technique and interferometric bathymetry to form 3D contacts 129, segmentation processor 132 separating 3D contacts 129 from background 137, feature vector creator 113 creating feature vectors 131 from segmented 3D contacts 129A, and classifier 115 classifying feature vectors 131 based on support vector machine 128 and clustering 144 to provide mine/no-mine indicator 133 to mine database 117 and/or to electronic communications 124.

Figure 3B:
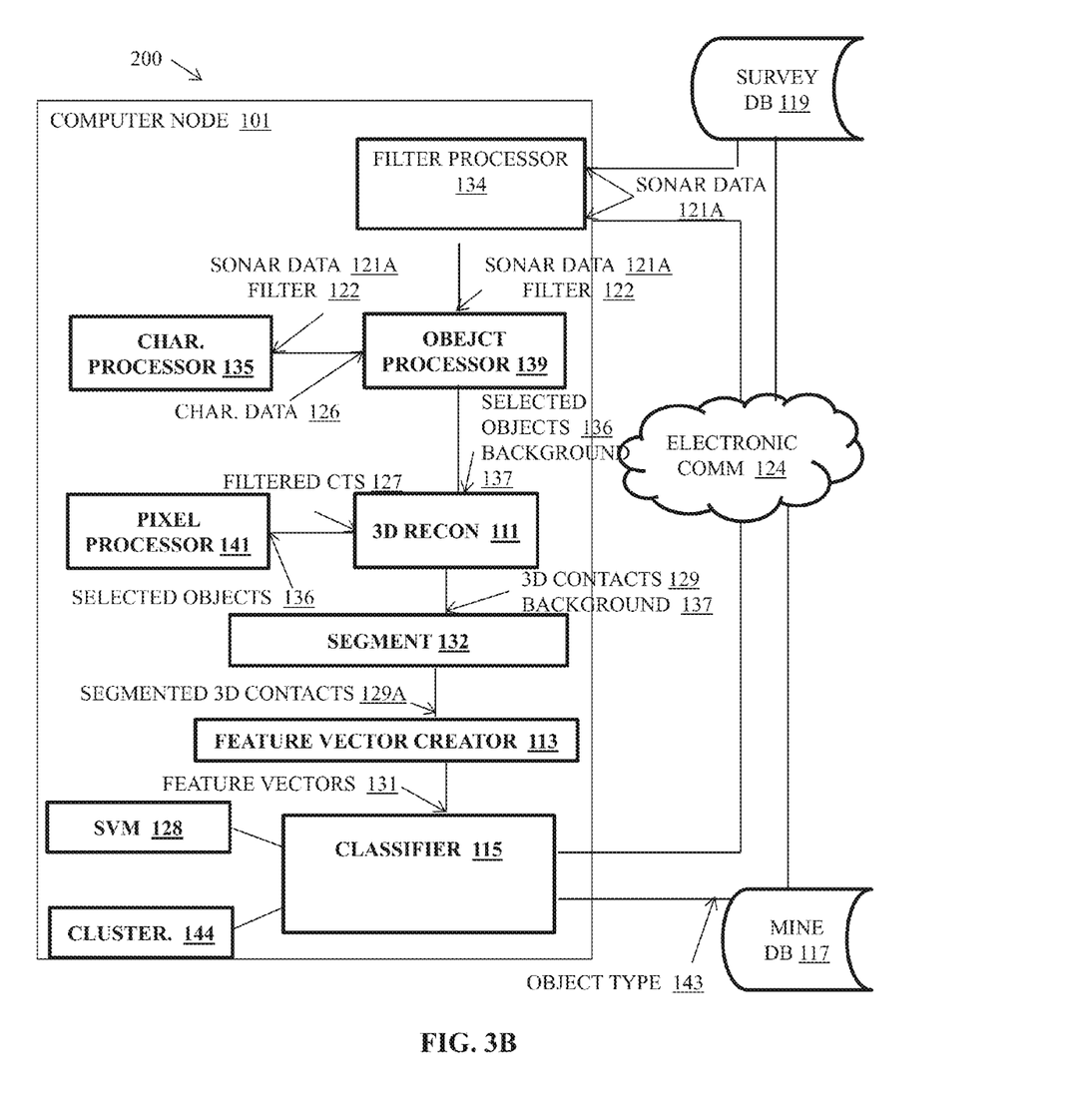
FIG. 3B is a schematic block diagram of a second embodiment of the system of the present teachings.

Referring now to FIG. 3B, system 200 of the present teachings for detecting and classifying man-made objects on the seafloor, which executes on a special purpose computer possibly including special purpose hardware, software, and/or firmware or a combination, can include, but is not limited to including, filter processor 134 creating filter 122 to detect differences in characteristics between natural and manmade objects on the seafloor, filter processor receiving sonar data 121A of, for example, but not limited to, the seafloor from for example, but not limited to, survey database 119 and/or electronic communications 124. System 200 can also include object processor 139 selecting manmade objects from sonar intensity data 121A based on filter 122, and 3D reconstruction processor 111 creating 3D reconstructions 129 from selected objects 136 by melding multiple scans of information about selected objects 136. System 200 can still further include segmentation processor 132 separating background 137 from 3D contacts 129 to created segmented 3D contacts 129A, feature vector creator 113 creating feature vectors 131 based on segmented 3D contacts 129A, and classifier 115 classifying feature vectors 131 based on support vector machine 128 and clustering 144 to provide object type 143 to mine database 117 and/or to electronic communications 124. System 200 can optionally include characteristics processor 135 providing characteristics data 126 of sonar data 121A based on filter 122 to object processor 139 which can use characteristics data 126 to provide selected objects 136 to 3D reconstruction processor 111. System 200 can also optionally include pixel processor 141 detecting pixel to pixel variation in seafloor digital images indicating differentiation between platonic and non-platonic shapes and creating filtered contacts 127 from selected objects 136 that can be isolated from background 137 by segmentation processor 132. Pixel processor 141 can also detect pixel to pixel variation in seafloor digital images indicating differentiation between objects based on sea encrustation on the objects and facet boundaries of the objects. Pixel processor 141 can extract height characteristics from sonar data 121A by performing interferometry between two sonar arrays of sonar data 121A. Pixel processor 141 can also optionally detect pixel to pixel intensity variation across sonar data 121A, and can imply a curvature from the variation. Implying a curvature can be done using a shape-from-shadow technique. Feature vector creator 113 can optionally compute lengths and widths of the objects in pixels based on the number of pixels along the length and width and multiply the length pixel number and the width pixel number by a length pixel size and a width pixel size, respectively. Feature vector creator 113 can optionally determine a greatest reflection from the object and base feature vectors 131 on the greatest reflection, and can compute the difference between pixel intensity of the brightest pix in the object and the darkest pixel in the shadow.

Figure 4:
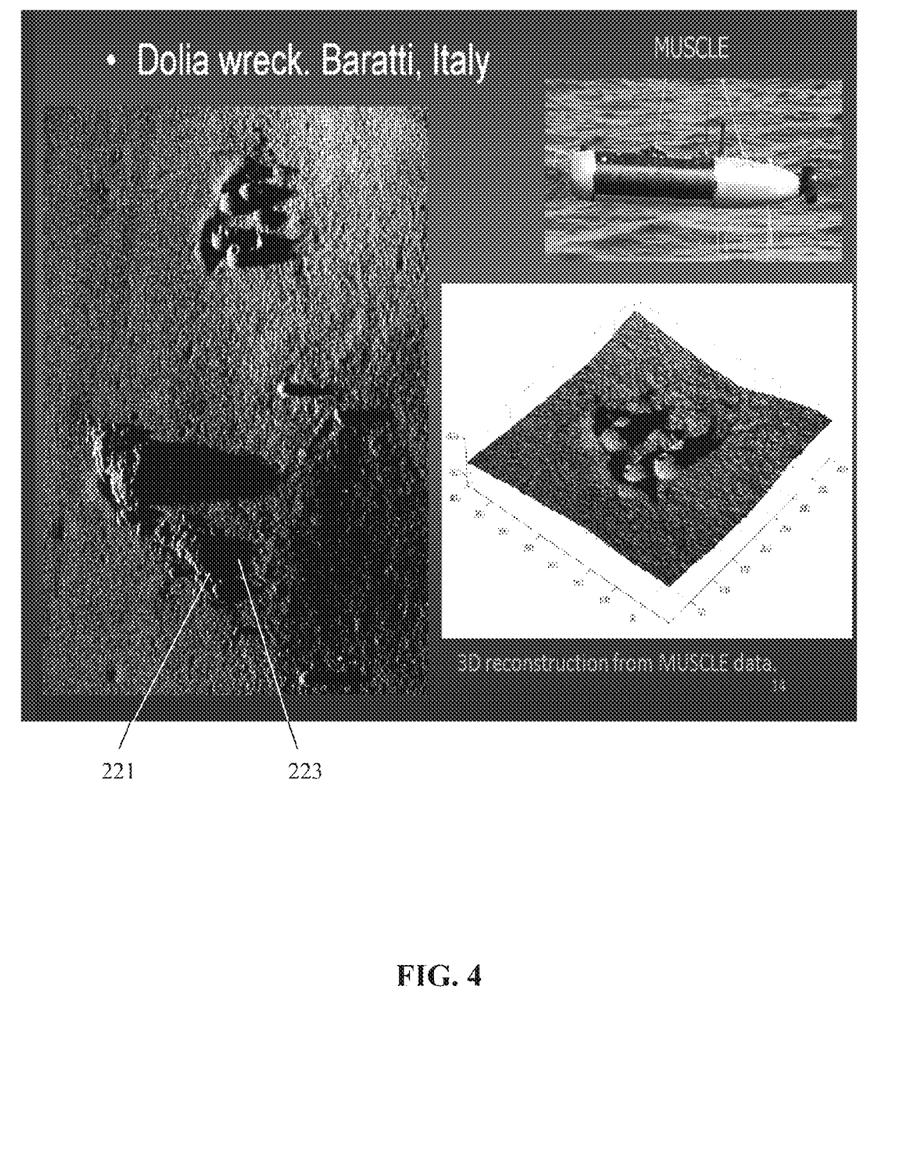
FIG. 4 is a pictorial example of 3D reconstruction.

Referring now to FIG. 4, detecting pixel to pixel variation in seafloor digital images can indicate a difference between platonic and non-platonic shapes, or a differentiation between objects based on sea encrustation on the objects or a facet boundary. For example, a facet boundary of amphora 221 can be detected by a pixel to pixel variation between amphora 221 and shadow 223. Creating a 3D reconstruction can include extracting height characteristics from the sonar intensity data by performing interferometry (see, for example, Allen, C. T., *Interferometric Synthetic Aperture Radar*, http://ittc.ku.edu/publications/documents/Allen1995_Allen1995GRSSNpp6.pdf, Jul. 2, 1997) between two sonar arrays of the sonar intensity data.

Figure 5:
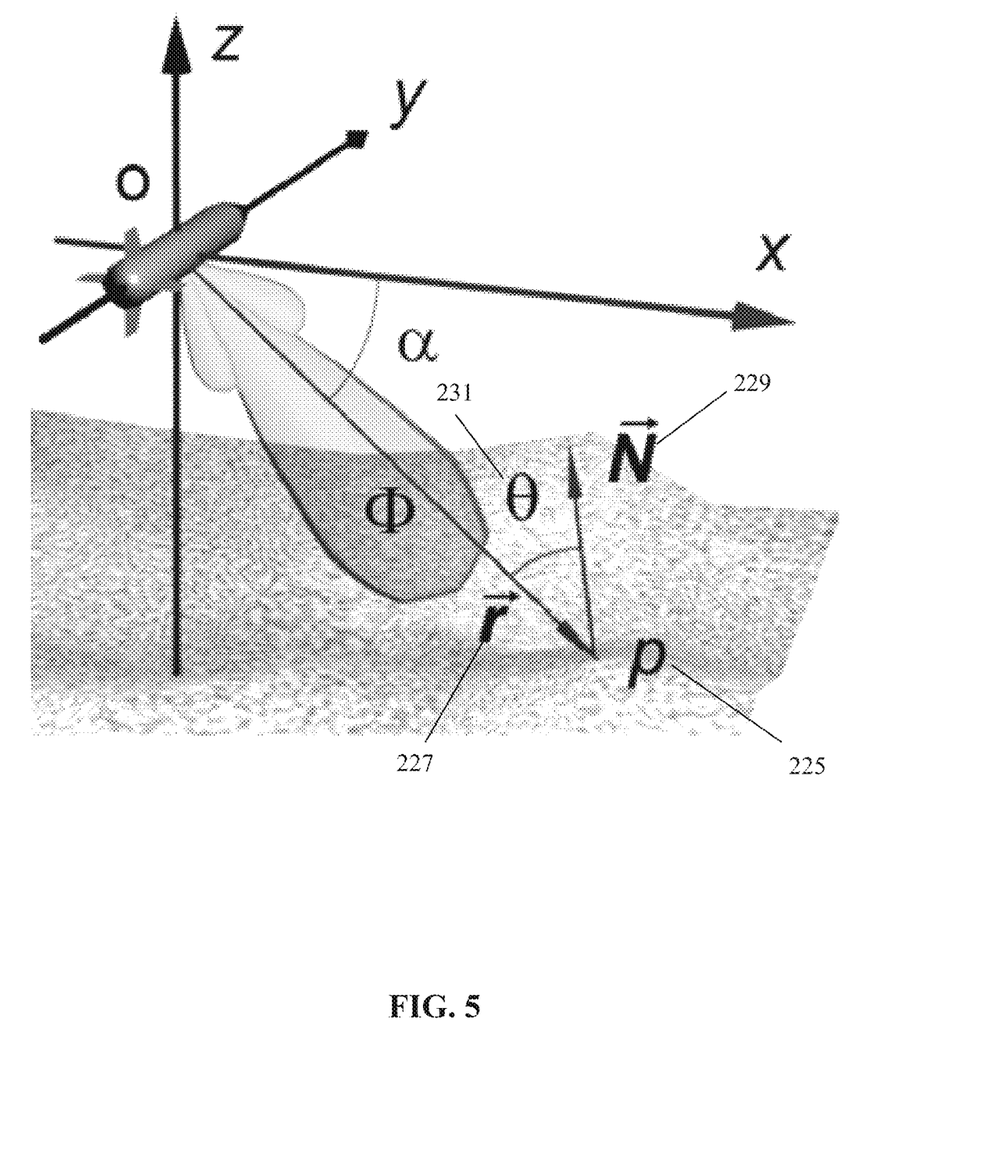
FIG. 5 is a graphical representation of the spatial information required for computing shape from shadow according to a conventional method.

Referring now to FIG. 5, detecting pixel to pixel intensity variation across the sonar intensity data and implying a curvature from that variation can be accomplished, for example, using a shape-from-shadow technique (see, for example, Savarese, S., *Shape Reconstruction from Shadows and Reflections*, CA Institute of Technology, PhD Thesis, Pasadena, Calif., 2005). First, inverting provides coordinates r 227, N 229, and θ 231 of position p 225 from the intensity detected at position p 225, I(p)

$$I(x(p),y(p)) \propto r(p) \cdot N(p) = \cos\theta(p) \tag{1}$$

Next, assuming Lambertian reflectance, transforming from polar coordinates at the UUV to Cartesian coordinates allows the derivation of dα

$$\cos(d\alpha) = \frac{1}{r+dr}\left(-r\sin^2\theta + r + \sqrt{r^2\sin^4\theta + dr^2\sin^2\theta + 2rdr\sin^2\theta}\right) \tag{2}$$

Using these relations, the change of intensity, I, can be related to normal vector N 229. Normal vectors can be used to align images.

Embodiments of the present teachings are directed to computer systems for accomplishing the methods discussed in the description herein, and to computer readable media containing programs for accomplishing these methods. The raw data and results can be stored for future retrieval and processing, printed, displayed, transferred to another computer, and/or transferred elsewhere. Communications links such as electronic communications 124 (FIG. 3A) can be wired or wireless, for example, using cellular communication systems, military communications systems, and satellite communications systems. In an exemplary embodiment, the software for the system is written in a high level computer language. The system can operate on a computer having a variable number of CPUs. Other alternative computer platforms can be used. The operating system can be, for example, but is not limited to, WINDOWS® or LINUX®.

The present embodiment is also directed to software for accomplishing the methods discussed herein, and computer readable media storing software for accomplishing these methods. The various modules described herein can be accomplished on the same CPU, or can be accomplished on different computers. In compliance with the statute, the present embodiment has been described in language more or less specific as to structural and methodical features. It is to be understood, however, that the present embodiment is not limited to the specific features shown and described, since the means herein disclosed comprise preferred forms of putting the present embodiment into effect.

Methods such as method 150 (FIG. 2) of the present embodiment can be, in whole or in part, implemented electronically. Signals representing actions taken by elements of the system and other disclosed embodiments can travel over at least one live communications network. Control and data information can be electronically executed and stored on at least one computer-readable medium. Systems 100 (FIG. 3A) and 200 (FIG. 3B) can be implemented to execute on at least one computer node 101 (FIGS. 3A and 3B) in at least one live communications network 124 (FIGS. 3A and 3B). Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form including, but not limited to, Graphic Interchange Format (GIF), Joint Photographic Experts Group (JPEG), Portable Network Graphics (PNG), Scalable Vector Graphics (SVG), and Tagged Image File Format (TIFF).

Although the present teachings have been described with respect to various embodiments, it should be realized these teachings are also capable of a wide variety of further and other embodiments.

What is claimed is:

1. An automatic computer method for detecting and classifying manmade objects comprising:
   automatically creating, by a computer, a filter to detect differences in characteristics between natural and manmade objects;
   automatically receiving, by the computer, sonar intensity data, the sonar intensity data including objects and background;
   automatically selecting, by the computer, manmade objects from the objects and background based on the filter;
   automatically separating, by the computer, the selected manmade objects from a background by segmentation;
   automatically creating, by the computer, a 3D reconstruction of the selected manmade objects by melding multiple scans of information about the selected manmade objects;
   automatically creating, by the computer, feature vectors based on the 3D reconstruction; and
   automatically classifying, by the computer, the feature vectors into types based on support vector machine technology and clustering technology.

2. The method as in claim 1 wherein creating the 3D reconstruction comprises:
   automatically detecting pixel to pixel variation in seafloor digital images indicating differentiation between platonic and non-platonic shapes.

3. The method as in claim 1 wherein creating the 3D reconstruction comprises:
   automatically detecting pixel to pixel variation in seafloor digital images indicating differentiation between objects based on sea encrustation on the objects.

4. The method as in claim 1 wherein creating the 3D reconstruction comprises:
   automatically detecting pixel to pixel variation in seafloor digital images indicating differentiation based on facet boundaries of the objects.

5. The method as in claim 1 wherein creating a 3D reconstruction comprises:
   automatically extracting height characteristics from the sonar intensity data by performing interferometry between two sonar arrays of the sonar intensity data.

6. The method as in claim 1 wherein creating a 3D reconstruction comprises:
   automatically detecting pixel to pixel intensity variation across the sonar intensity data; and
   automatically implying a curvature from the variation.

7. The method as in claim 6 wherein implying a curvature comprises:
   automatically using a shape-from-shadow technique.

8. The method as in claim 1 wherein creating feature vectors comprises:
   automatically computing lengths and widths of the objects in pixels based on the number of pixels along the length and width; and
   automatically multiplying the length pixel number and the width pixel number by a length pixel size and a width pixel size, respectively.

9. The method as in claim 1 wherein creating feature vectors comprises:
   automatically determining a greatest reflection from the object; and
   automatically basing the feature vectors on the greatest reflection.

10. The method as in claim 1 wherein creating feature vectors comprises:
    automatically computing the difference between pixel intensity of the brightest pix in the object and the darkest pixel in the shadow.

11. A computer system for detecting and classifying manmade objects comprising:
    a filter processor executing on a special purpose computer creating a filter to detect differences in characteristics between natural and manmade objects, the filter processor receiving sonar intensity data, the sonar intensity data including objects and background;
    an object processor executing on the special purpose computer selecting manmade objects from the objects and background based on the filter;
    a 3D reconstruction processor executing on the special purpose computer creating a 3D reconstruction of the selected manmade objects by melding multiple scans of information about the selected manmade objects;
    a segmentation processor on the special purpose computer separating the 3D reconstruction from the background;
    a feature vector creator executing on the special purpose computer creating feature vectors based on the 3D reconstruction; and
    a classifier executing on the special purpose computer classifying the feature vectors into types based support vector machine technology and clustering technology.

12. The system as in claim 11 further comprising:
    a pixel processor executing on the special purpose computer detecting pixel to pixel variation in seafloor digital images indicating differentiation between platonic and non-platonic shapes.

13. The system as in claim 11 further comprising:
    a pixel processor executing on the special purpose computer detecting pixel to pixel variation in seafloor digital images indicating differentiation between objects based on sea encrustation on the objects.

14. The system as in claim 11 further comprising:
    a pixel processor executing on the special purpose computer detecting pixel to pixel variation in seafloor digital images indicating differentiation based on facet boundaries of the objects.

15. The system as in claim 11 further comprising:
    a pixel processor executing on the special purpose computer extracting height characteristics from the sonar intensity data by performing interferometry between two sonar arrays of the sonar intensity data.

16. The system as in claim 11 further comprising:

a pixel processor executing on the special purpose computer detecting pixel to pixel intensity variation across the sonar intensity data, and implying a curvature from the variation.

17. The system as in claim 16 wherein implying a curvature comprises:

using a shape-from-shadow technique.

18. The system as in claim 11 wherein the feature vector creator further comprises:

computer code executing on the special purpose computer:

computing lengths and widths of the objects in pixels based on the number of pixels along the length and width; and multiplying the length pixel number and the width pixel number by a length pixel size and a width pixel size, respectively.

19. The system as in claim 11 wherein the feature vector creator further comprises:

computer code executing on the special purpose computer:

determining a greatest reflection from the object; and basing the feature vectors on the greatest reflection.

20. The system as in claim 11 wherein the feature vector creator further comprises:

computer code executing on the special purpose computer computing the difference between pixel intensity of a brightest pixel in the object and a darkest pixel in the shadow.

* * * * *